(12) United States Patent
Marks

(10) Patent No.: US 6,209,261 B1
(45) Date of Patent: *Apr. 3, 2001

(54) FIBER-REINFORCED CEMENT PANELS FOR PLANTER BOXES

(76) Inventor: Alan C. Marks, 7 La Rancheria, Carmel Valley, CA (US) 93924

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/916,042

(22) Filed: Aug. 21, 1997

Related U.S. Application Data

(63) Continuation of application No. 08/641,435, filed on May 1, 1996, now abandoned.

(51) Int. Cl.[7] ........................................................ A01G 9/02
(52) U.S. Cl. .......................................................... 47/66.1
(58) Field of Search ............................ 47/65.5, 58, 1.01, 47/66.1

(56) References Cited

U.S. PATENT DOCUMENTS

| | | | | |
|---|---|---|---|---|
| 1,407,664 | * | 2/1922 | Kuebler | 47/66 SC |
| 1,420,191 | * | 6/1922 | Hassig | 47/66.1 |
| 2,089,353 | * | 8/1937 | Fischer | 47/66 MD |
| 3,955,320 | * | 5/1976 | Serovy | 47/66 SC |
| 4,115,501 | * | 9/1978 | Yano | 264/133 |

FOREIGN PATENT DOCUMENTS

| | | | | |
|---|---|---|---|---|
| 2399795 | * | 4/1979 | (FR) | 47/66 MD |
| 4099417 | * | 3/1992 | (JP) | 47/66 MD |
| 4316429 | * | 11/1992 | (JP) | 47/66 MD |

* cited by examiner

*Primary Examiner*—Peter M. Poon
*Assistant Examiner*—Elizabeth Shaw

(57) ABSTRACT

A wooden planter box (1) using thin fiber-reinforced cement sheet as interior panels (24, 26) which are intended to contain solid nutrients such as soil and fertilizer. This constitutes a new and totally different application for fiber-reinforced cement sheet. The panels themselves form a receptacle in such a way as to protect the supporting wooden structure which encloses them from contact with the solid nutrients contained by the planter box while absorbing water and enabling the transmission of oxygen to the roots of the plant.

16 Claims, 4 Drawing Sheets

FIBER-REINFORCED CEMENT PANELS FOR PLANTER BOXES

CROSS-REFERENCES TO RELATED APPLICATIONS

This is a continuation of Ser. No. 08/641,435, filed May 1, 1996, now abandoned.

This invention can utilize the construction of my co-pending application, provisional patent #60/011,875, filed Feb. 19, 1996.

BACKGROUND OF THE INVENTION

Wood, metal and cement are well-known materials used for fabricating flower pots. Wood is particularly desirable because of its beauty and the fact that it is easily cut and shaped with hand tools into flower pots of any shape or size and when exposed to the sun, wooden containers will gradually fade in color to a uniform grey. Wood, however, has two main disadvantages. It is expensive and it will decay over time. Even the exotic and expensive woods like cedar and redwood will decay eventually so it is desirable, if possible, to find some way to use less expensive wood or to extend the life of the more exotic wood containers.

In the past people have sought to extend the life of wooden containers with metal liners, but metal has several disadvantages of it's own. First it does not breathe. Plant roots need oxygen, and though this can be compensated for by providing non-compacted growing medium and plenty of drainage some plants will not thrive in metal containers. Also, metal containers will release metal ions into the soil. This is particularly detrimental with copper liners but zinc and iron can also be detrimental to some plants. It has also been substantiated that protective metal liners may trap water against the wood, promoting decay and sometimes discoloring the wood.

Containers formed of cast cement have the disadvantage of being heavy and, because of their thickness, often they do not breathe any better than metal containers.

OBJECTS OF THE INVENTION

It is an object of this invention to extend the life of wooden containers, to minimize the use of wood in plant containers, to provide a container which will breathe and to provide a plant container which has uniform color. It is further an object of this invention to produce plant containers which will provide a healthy environment for plants which require well drained and oxygen rich soil. Another object is to provide lined wooden containers which will not leach metal ions into the soil of a plant container.

SUMMARY

This invention relates to a unique combination of materials. Very thin, easily-cut sheets of cement can be used to line the wooden portions of flower pots to produce a new and unique relationship of materials. The resulting plant containers are beautiful and long lasting. Cement does not condense water or trap water like metal does, due to its porosity, so it does not promote decay. Also cement liners do not discolor the wood as a metal liner might. Further, wood when exposed to light for a long period of time will fade to a uniform grey color to match the color of the cement so that if exposed cement panels are provided with a raised grain the resulting container may with time look like one that is made of solid wood instead of a wood-cement composite.

Using these thin sheets of cement material as liners for wooden benefits the plants growing in the containers. Cement has a slightly alkaline composition which is required by many plants and it does not leach harmful metal ions into the soil. Furthermore the somewhat porous, thin sheets of cement will breathe slightly allowing transfer of oxygen and carbon dioxide through the walls of the container.

BRIEF DESCRIPTION OF THE DRAWINGS

Further objects and advantages of the present invention will become apparent from a consideration of the detailed description of the preferred embodiment of the invention which follows, this brief description, in which.

DETAILED DESCRIPTION OF THE PREFERRED EMBODIMENT

Figure 1:
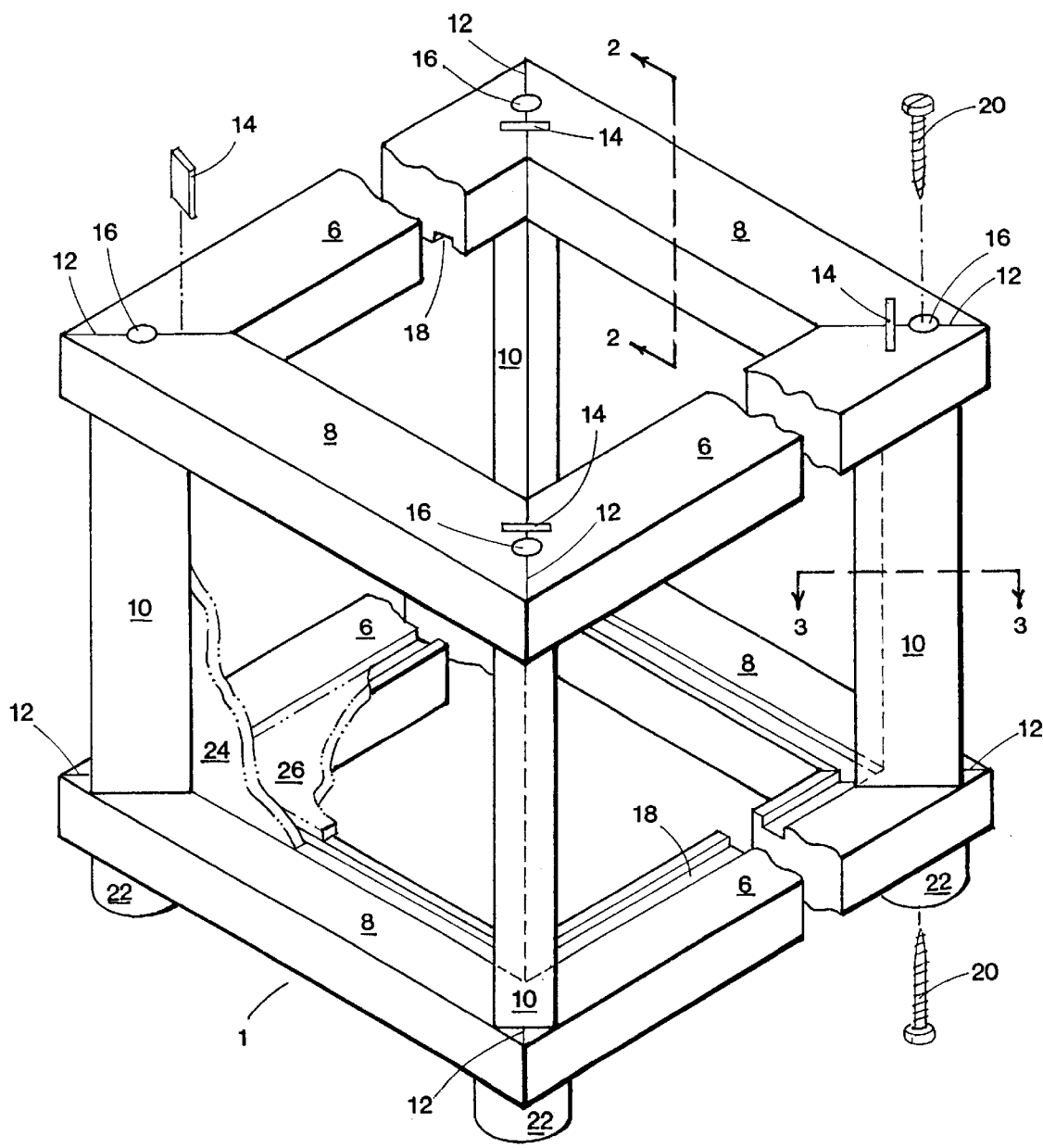
FIG. 1 illustrates how fiber-reinforced cement panels are used to line the sides of a wooden frame structure in a fragmentary perspective view. Portions of a side panel and a bottom are indicated by phantom lines to show the manner in which a side and a bottom relate to the framework structure. Neither side nor bottom are integral parts of the framework.
Figure 2:
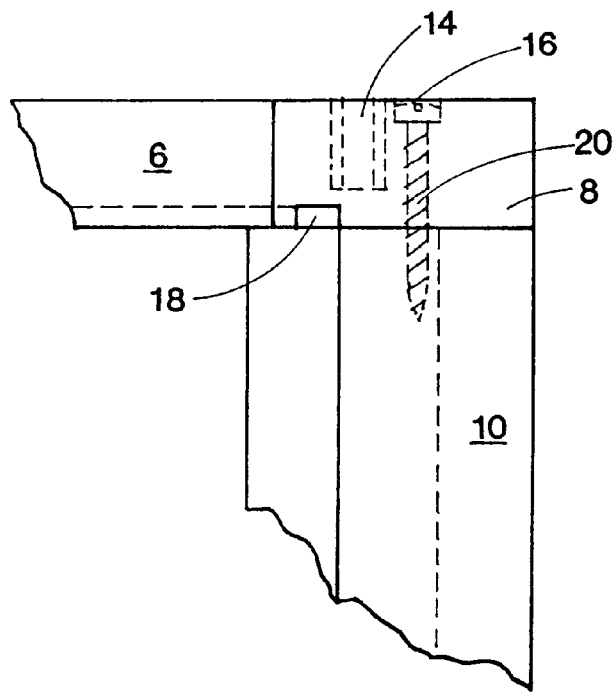
FIG. 2 is a fragmentary sectional view of FIG. 1 along the line 2—2 of FIG. 3.
Figure 3:
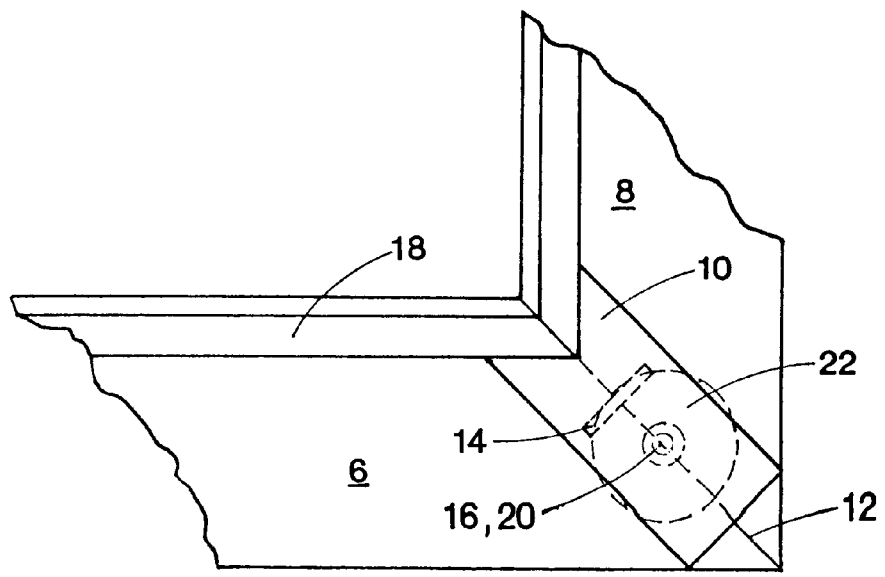
FIG. 3 is a fragmentary sectional view of FIG. 1 along the line 3—3 of FIG. 3.

The preferred embodiment is shown in FIG. 1. The illustrated knockdown framework consists of an upper and a lower frame. These are identical, preassembled frames which may be either square or rectangular in shape. These frames are formed by two pairs of opposing parallel members (6,8) which are rectangular in cross-section. The members join at each corner in a miter joint (12). The joint is shown secured by means of a staple (14).

Each discrete frame member has a mortise, (18), to receive the side panels. A fiber reinforced cement side panel (24) is indicated to indicate placement. The mortises align and form a continuous groove around the frames' inner perimeters.

A ¼" material marketed as Hardibacker Multilay is preferably used for the panels. It is available from James Hardie Building Products, Inc., of Fontana, Calif. However, other manufacturers also produce fiber cement products, under such trade names as "Maxibacker" or "Wonderboard" or "Durock". These products are marketed specifically as underlayments and backerboards for ceramic tile. The sides of the wooden structure are fully protected from rot- and decay-causing micro-organisms present in soil and fertilizer by fiber reinforced cement panels.

The upper frame is oriented such that its groove is on its lower surface. The lower frame is oriented such that its groove is on its upper surface.

The assembled frames have clearance holes (16) at each miter joint (12) for eight screws (20) which engage and secure the frames to four identical vertical posts (10). The posts are V-grooved at right angles along their inside vertical edges. The surfaces of the groove thus formed are aligned along the same planes as the sides of the continuous frame mortises. Together, the mortises and the inner vertical surfaces of the grooved posts provide support for the panels against the pressure of soil contained by the planter box.

A fiber reinforced cement bottom (26) is shown to indicate placement. It rests on the portion of the upper interior surface of the bottom frame. This portion is inside the perimeter formed by the mortise.

Although not an integral part of the framework, feet (22) are nevertheless shown to indicate how the framework's design makes possible the attachment of feet without any additional fastening means. Feet perform the desirable function of separating the lower frame from contact with the ground. They may be made of a durable nonabsorbant material such as plastic.

Figure 4:
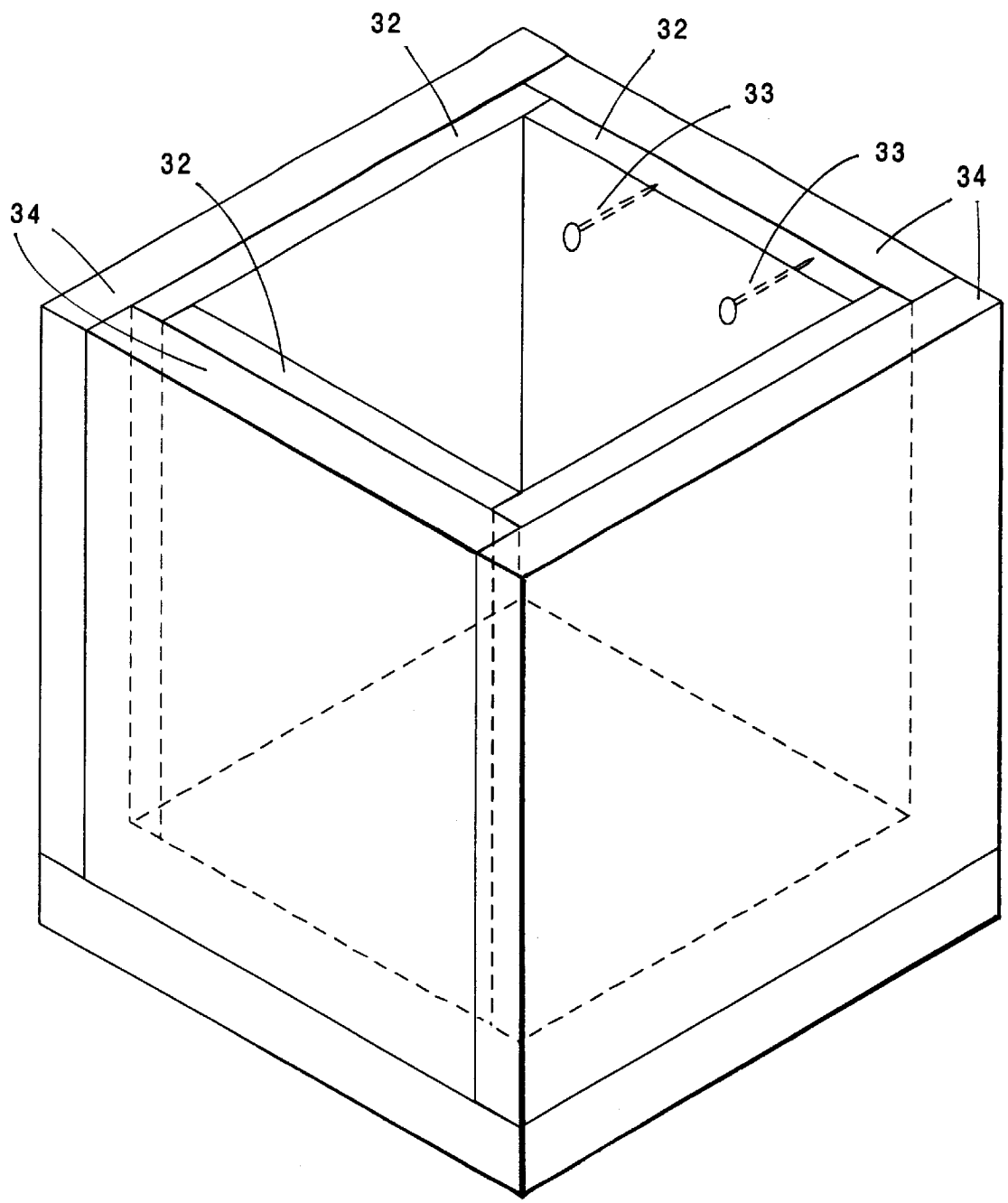
FIG. 4 illustrates the use of fiber-reinforced cement panels to line the sides and bottom of an enclosing open top wooden structure. Hidden lines clarify the relative position of the side panels. Fasteners are also referenced. Arrows indicate the pressure of soil against the sides.
Figure 5:
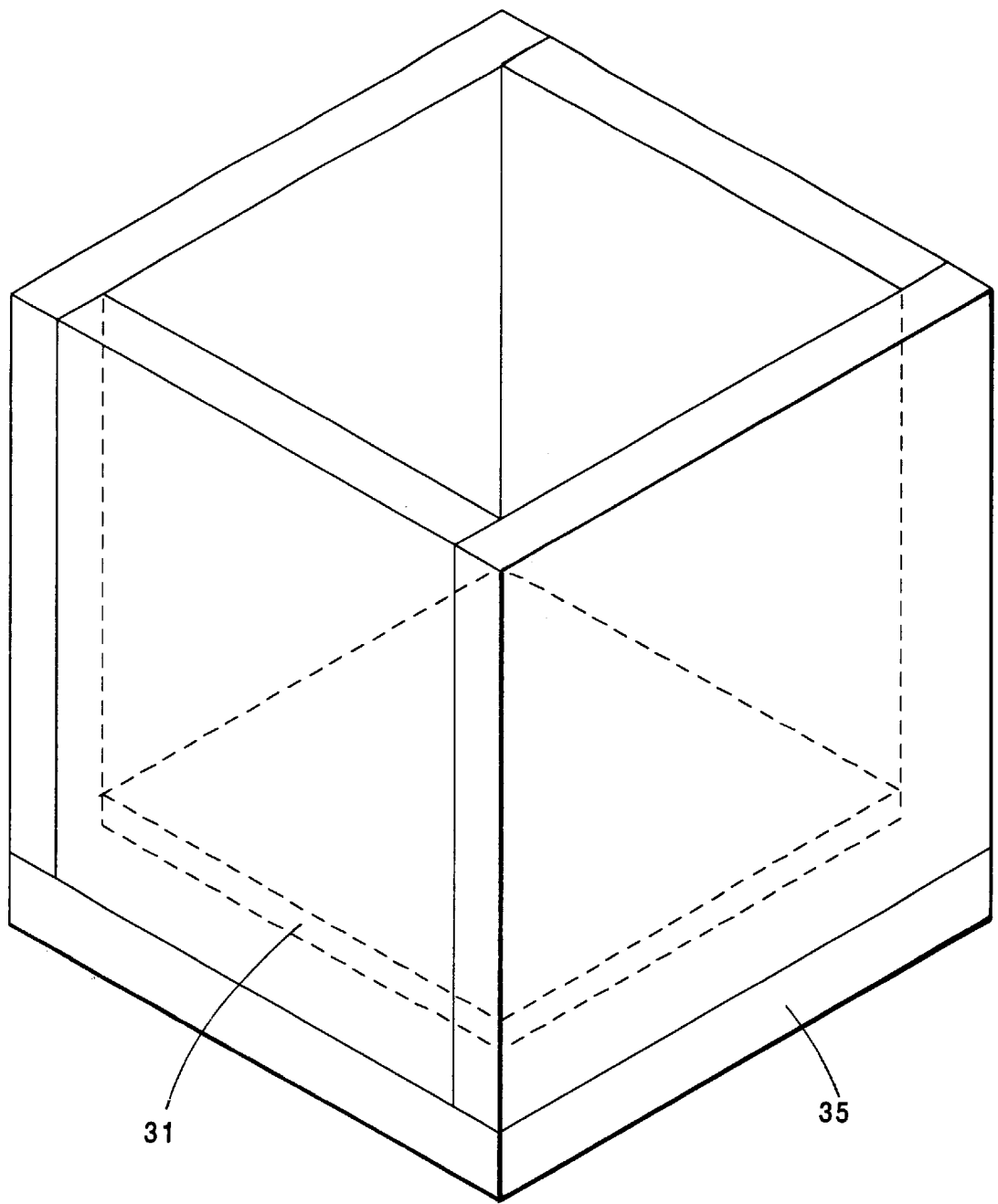
FIG. 5 illustrates the use of a fiber-reinforced cement panel to line the bottom of an enclosing open top wooden structure.

FIGS. 4 and 5 illustrate two usages of fiber-reinforced cement panels to line a wooden planter box structure. Wherever deemed necessary to clarify the relative position of said panels, hidden lines have been indicated.

In FIG. 4, a less advantageous embodiment of the present invention is shown. Fiber-reinforced cement panels (32), line the sides (34) of a wooden box, oriented vertically. The sides of the wooden container are consequently protected from rot- and decay-causing micro-organisms present in soil and fertilizer.

The filling of the planter box may be complicated by the need to physically hold its panels in position during the filling. Fasteners (33) hold the panels in position in this embodiment. Many types of fasteners may be used. For example, screws, staples, nails or rivets could be used to advantage. Panels may alternatively be held, as shown in FIG. 1, by means of grooves in a skeletal external framework. Alternatively, the panels may be held under compression in a wooden framework. Adhesives may also be used to secure the panels. In the embodiment illustrated in FIG. 4, soil or other solid nutrient presses against the sides, as indicated by the arrow vectors.

FIG. 5 shows a fiber-reinforced cement panel used in a horizontal position as a bottom liner (31). Thusly, the wood bottom (35) is safe from contact with decay-causing micro-organisms in the soil. The sides, however, will be exposed to decay in this embodiment.

Although the above description contains many specificities, these should not be construed as limitations on the scope of the invention, but rather as an exemplification of one preferred embodiment thereof. Many variations are possible. For example, as mentioned, the panels may be of any shape and configuration and the framework in which they are held may have any number of sides and individual vertical, horizontal, and angled members. frame members may be fastened together by means other than as illustrated and other fastening means other than the one illustrated might be employed to secure the frames to the posts. Additionally, the posts may be grooved in a different configuration or may contain multiple grooves.

Thus the scope of the invention should not be determined by the embodiments illustrated. The scope should be determined by the appended claims and their legal equivalents.

I claim:

1. An open top wooden planter box structure enclosing an interior growing area for containing dirt or growing medium comprising:

a plurality of vertical wooden side members, a generally horizontal wooden bottom structure, and a panel of fiber reinforced cement sheet along the interior surface of each of said side members.

2. The wooden planter box structure as claimed in claim 1 wherein dirt or owing medium is placed against said panel to hold it in place against the interior of said side members.

3. The wooden planter box structure as claimed in claim 1 further including fastening means to secure each of said panels to each said side member.

4. A method of protecting parts of a flower pot having, wooden components comprising the steps of:

assembling a wooden open top planter box structure having a plurality of vertical wooden side members and a generally horizontal wooden bottom structure;

interposing a panel of fiber-reinforced cement between the interior of said planter box and each of said side members; and filling said interior with dirt or growing medium whereby the fiber-reinforced cement forms a slightly porous barrier between the contained earth and said side members.

5. An open top wooden planter box structure enclosing an interior growing area for containing dirt or growing medium comprising:

a plurality of vertical wooden side members, a generally horizontal wooden bottom structure, and a horizontal panel of fiber reinforced cement along the interior surface of said wooden bottom structure.

6. The wooden planter box structure as claimed in claim 5 further including fastening means to secure said horizontal panel said bottom structure.

7. A wooden open top planter box structure as claimed in claim 6 wherein said structure comprises:

two opposing frames, one horizontally positioned upper frame and one horizontally positioned lower frame, said upper frame consisting of two or more pairs of opposing members joined and fastened at their abuttments by fastening means, said members having parallel inside and outside vertically parallel edges and horizontally parallel top and bottom surfaces, a plurality of vertical wooden posts connecting said frames, wherein each of said posts has a plurality of vertical surfaces, each of said posts abutting opposing corners of said upper and lower frames, a plurality of fiber-reinforced cement side panels positioned against the inner surfaces of said posts, with the bottom edges of said panels resting on the surface of said lower frame, a generally horizontal fiber reinforced cement bottom panel, said bottom panel resting supported upon the top surface of said lower frame, positioned within the interior space bounded by said posts.

8. The wooden open top planter box structure of claim 7 wherein the members of said upper and lower frames abutt one another by means of miter joints.

9. The wooden open top planter box structure claimed in claim 7 wherein the side edges of each of said side panels are housed in vertical grooves along two of said posts.

10. The planter box structure as claimed in claim 7 in which the pressure of dirt or growing medium is used to secure said panels in a fixed position.

11. The planter box structure as claimed in claim 7 in which fastening means are used to secure said panels in fixed positions.

12. The planter box structure as claimed in claim 7 wherein the bottom surface of said upper frame further has an open continuous groove around the inside of its perimeter and in which the top surface of said lower frame further has an open continuous groove around the inside of its perimeter, each of said grooves being adjacent and parallel to the inside edges of said upper and lower frames.

13. The wooden open top planter box structure claimed in claim 12 wherein the side edges of each of said side panels are housed in vertical grooves along two of saidposts.

14. The wooden planter box structure as claimed in claim 12 wherein the bottom edge of each of said side panels is contained within the open continuous groove around the inside perimeter of the top surface of said bottom frame and wherein the top edge of each of said side panels is contained within the open continuous groove around the inside perimeter of the bottom surface of said top frame.

15. A method of protecting parts of a flower pot having wooden components comprising the steps of:

assembling a wooden open top planter box structure having a plurality of vertical wooden side members and a generally horizontal wooden bottom structure;

interposing a panel of fiber-reinforced cement between the interior of said planter box and said bottom structure; and filling said interior with dirt or growing medium whereby the fiber-reinforced cement forms a slightly porous barrier between the contained earth and said bottom structure.

16. A method of protecting parts of a flower pot having wooden components comprising the steps of assembling a wooden open top planter box structure having an upper frame, a lower frame and posts to define the interior of a planter;

vertically placing fiber-reinforced cement panels such that the panels are interposed between the interior of said container and said posts;

positioning a fiber-reinforced cement panel bottom along the top surface of said lower frame so that the panel is interposed between the interior of said container and said lower frame; and filling said interior with dirt or growing medium whereby the fiber reinforced cement forms a slightly porous barrier between the contained earth and the wooden parts of the container.

\* \* \* \* \*